(12) United States Patent
Stenta

(10) Patent No.: US 11,920,777 B1
(45) Date of Patent: Mar. 5, 2024

(54) TAPE MEASURE LIGHT ATTACHMENT

(71) Applicant: Nino Romeo Stenta, Medford, NJ (US)

(72) Inventor: Nino Romeo Stenta, Medford, NJ (US)

(*) Notice: Subject to any disclaimer, the term of this patent is extended or adjusted under 35 U.S.C. 154(b) by 0 days.

(21) Appl. No.: 18/089,823

(22) Filed: Dec. 28, 2022

Related U.S. Application Data

(60) Provisional application No. 63/295,012, filed on Dec. 30, 2021.

(51) Int. Cl.
| | |
|---|---|
| *F21V 23/04* | (2006.01) |
| *F21V 33/00* | (2006.01) |
| *G01B 3/1084* | (2020.01) |
| *F21Y 115/10* | (2016.01) |
| *G01S 17/08* | (2006.01) |

(52) U.S. Cl.
CPC ...... *F21V 33/0084* (2013.01); *F21V 23/0414* (2013.01); *G01B 3/1084* (2013.01); *F21Y 2115/10* (2016.08); *G01B 2003/1087* (2013.01); *G01S 17/08* (2013.01)

(58) Field of Classification Search
CPC ............. F21V 33/0084; F21V 23/0414; G01B 3/1084; G01B 2003/1087; F21Y 2115/10; G01S 17/08
See application file for complete search history.

(56) References Cited

U.S. PATENT DOCUMENTS

| | | | |
|---|---|---|---|
| 1,006,056 A | 10/1911 | Bowers | |
| 4,462,160 A | 7/1984 | Cohen et al. | |
| 4,580,347 A * | 4/1986 | McKnight | G01B 3/11 24/3.12 |
| 4,944,097 A | 7/1990 | Kang | |
| 5,544,420 A * | 8/1996 | Choi | G01D 11/28 362/120 |
| 6,030,091 A | 2/2000 | Li | |
| 6,209,219 B1 | 4/2001 | Wakefield et al. | |
| 6,256,901 B1 * | 7/2001 | Lin | G01B 3/1005 33/767 |
| 6,826,845 B2 | 12/2004 | Pritchard | |
| 6,898,866 B2 | 5/2005 | Weeks | |
| 7,024,791 B2 | 4/2006 | Marshall et al. | |
| 7,065,895 B2 | 6/2006 | Hoopengamer | |
| 7,174,655 B1 * | 2/2007 | Gibbons | G01B 3/1084 33/759 |

(Continued)

*Primary Examiner* — Evan P Dzierzynski
(74) *Attorney, Agent, or Firm* — John Rizvi; John Rizvi, P.A.—The Patent Professor®

(57) ABSTRACT

A tape measure light attachment which can be deployed on the extended measuring tape of a tape measure for illumination purposes may include an assembly housing. A light assembly may be provided on the assembly housing. The light assembly may be selectively configurable to emit light upon activation. A mount assembly may be provided on the assembly housing. The mount assembly may facilitate attachment of the assembly housing to the measuring tape. A hook assembly may be provided on the assembly housing. The hook assembly may be configured to facilitate engagement of the assembly housing with a retaining structure to retain or immobilize the assembly housing on the measuring tape as the measuring tape is extended from the tape housing of the tape measure to measure a length or distance from the point of engagement between the hook assembly with the retaining structure and the tape housing.

20 Claims, 7 Drawing Sheets

(56) References Cited

U.S. PATENT DOCUMENTS

| | | | |
|---|---|---|---|
| 7,584,548 B2 | 9/2009 | Nielson | |
| 8,516,713 B2 | 8/2013 | Carl | |
| 8,522,447 B1 | 9/2013 | Novotny | |
| 9,267,778 B2 | 2/2016 | Burch et al. | |
| 9,774,986 B2 | 9/2017 | Hoge | |
| 10,197,373 B2 | 2/2019 | Demartinis et al. | |
| 10,942,018 B2 | 3/2021 | Burch et al. | |
| 2005/0252021 A1* | 11/2005 | Kang | G01B 3/1041 33/769 |
| 2006/0042111 A1* | 3/2006 | Hoopengarner | G01B 3/1003 33/760 |
| 2006/0072308 A1* | 4/2006 | Booty, Jr. | F21V 21/30 362/190 |
| 2007/0017111 A1 | 1/2007 | Hoback et al. | |
| 2007/0206174 A1 | 9/2007 | Boegel et al. | |
| 2009/0307920 A1 | 12/2009 | Schrage | |
| 2010/0175273 A1* | 7/2010 | Seo | G01B 3/1056 33/770 |
| 2012/0275144 A1 | 11/2012 | Foster | |
| 2018/0164087 A1* | 6/2018 | Mrozinski | G01S 17/08 |
| 2021/0088193 A1* | 3/2021 | Hou | F21V 7/0075 |
| 2021/0131782 A1 | 5/2021 | Bridges et al. | |

\* cited by examiner

TAPE MEASURE LIGHT ATTACHMENT

CROSS-REFERENCE TO RELATED APPLICATIONS

This application claims the benefit of U.S. Provisional Patent Application Ser. No. 63/295,012, filed on Dec. 30, 2021, which is incorporated herein in its entirety.

FIELD OF THE INVENTION

The present invention relates generally to tape measures, and more particularly, to a tape measure light attachment which can be deployed on the extended measuring tape of a tape measure for illumination purposes.

BACKGROUND OF THE INVENTION

Tape measures are frequently used by electricians, construction workers and homeowners to measure lengths and distances. A tape measure may be used to measure a distance between two fixed points or a pre-determined distance from a reference point. In installation of a door in a door opening, for example, a tape measure may be used to measure the distance between opposite door facings in the opening. If the internal dimensions of the door opening are incorrectly measured, the door which is to be installed may not fit in the door opening. The tape measure may additionally be used to measure a fixed distance from the bottom of the door to the position on the door at which the doorknob or lock will be installed. The position of the doorknob or lock on the door must be correctly determined so that the doorknob or lock will engage the lock opening in the door strike plate on the door facing after the door is installed.

A conventional tape measure may include a tape housing. A flexible, retractable plastic or metal measuring tape may be wound on a spring-loaded spool inside the tape housing. A selected length of the measuring tape may be selectively extendable from the tape housing. A linear measuring scale having regularly spaced, numbered markings may be printed along the measuring tape. Each numbered marking may indicate the distance between the extending end of the measuring tape and the numbered mark. A locking mechanism on the tape housing may normally engage the extended measuring tape to maintain the tape in an extended position from the tape housing. The locking mechanism may be manipulated to facilitate retraction of the extended measuring tape back into the tape housing.

In some applications, it may be necessary to use a tape measure under low light conditions. For example, an electrician may need to take a measurement in a crawl space, sub-flooring or attic in which little light is present. In these situations, it may be difficult to see the location needed to accurately make a measurement.

Accordingly, there is need for a tape measure light attachment which can be deployed on the extended measuring tape of a tape measure for illumination purposes.

SUMMARY OF THE INVENTION

The present invention is directed to a tape measure light attachment which can be deployed on the extended measuring tape of a tape measure for illumination purposes. An illustrative embodiment of the tape measure light attachment may include an assembly housing. A light assembly may be provided on the assembly housing. The light assembly may be selectively configurable to emit light upon activation. A mount assembly may be provided on the assembly housing. The mount assembly may facilitate attachment of the assembly housing to the measuring tape. A hook assembly may be provided on the assembly housing. The hook assembly may be configured to facilitate engagement of the assembly housing with a retaining structure to retain or immobilize the assembly housing on the measuring tape as the measuring tape is extended from the tape housing of the tape measure to measure a length or distance from the point of engagement between the hook assembly with the retaining structure and the tape housing.

In an illustrative implementation of the invention, a tape measure light attachment which can be deployed on the extended measuring tape of a tape measure for illumination purposes may include an assembly housing. A light assembly may be provided on the assembly housing. The light assembly may be selectively configurable to emit light upon activation. A mount assembly may be provided on the assembly housing. The mount assembly may facilitate attachment of the assembly housing to the measuring tape with the light assembly facing forwardly from the assembly housing toward the extending or distal end of the measuring tape. A hook assembly may be provided on the assembly housing. The hook assembly may be configured to facilitate engagement of the assembly housing with a retaining structure to retain or immobilize the assembly housing on the measuring tape as the measuring tape is extended from the tape housing of the tape measure to measure a length or distance from the point of engagement between the hook assembly with the retaining structure and the tape housing.

In a second aspect, the assembly housing may have a housing bottom, a pair of spaced-apart housing sides, a housing top, a housing front and a housing rear.

In another aspect, the light assembly may be provided at the housing front of the assembly housing.

In another aspect, the light assembly may include at least one LED.

In another aspect, the light assembly may include at least one laser.

In another aspect, a range finding device may be provided in the assembly housing. The range finding device may be configured to emit a light or laser beam from the assembly housing against a structure or surface and calculate the distance of the structure or surface from the assembly housing by reflection of the light or laser beam.

In another aspect, at least one light switch may functionally interface with the light assembly.

In another aspect, the at least one light switch may include a button.

In another aspect, the at least one light switch may be provided at the housing rear of the assembly housing.

In another aspect, the light assembly may include a light cover.

In another aspect, the light cover of the light assembly may extend through a light cover opening in the housing front of the assembly housing.

In another aspect, a beam opening may extend through the light cover.

In another aspect, the light cover may have an elongated, conical shape with a tapered cover end.

In another aspect, the beam opening may be provided at the tapered cover end of the light cover.

In another aspect, the tapered cover end of the light cover may be magnetized to enable a user of the attachment to pick up metallic objects using the magnetized cover end.

In another aspect, the mount assembly may be configured to secure the extended measuring tape against the housing bottom of the assembly housing.

In another aspect, the mount assembly may include a clamp arm pivotally attached to the assembly housing and selectively configurable in a clamping configuration to secure the assembly housing on the extended measuring tape of the tape measure and a release configuration to facilitate removal of the assembly housing from the measuring tape.

In another aspect, the clamp arm may be elongated with a proximal arm end pivotally attached to the assembly housing and a distal arm end opposite the proximal arm end.

In another aspect, the proximal arm end of the clamp arm may be pivotally attached to the assembly housing at a junction between the housing bottom and one of the housing sides.

In another aspect, the mount assembly may include a lock tab on the clamp arm to detachably secure the clamp arm in the clamping configuration.

In another aspect, the lock tab may be provided at or adjacent to the distal arm end of the clamp arm.

In another aspect, at least one tab retainer may be provided on the lock tab to facilitate securement of the lock tab to the assembly housing.

In another aspect, the at least one tab retainer may include at least one tab magnet.

In another aspect, the at least one tab magnet on the lock tab may be configured to engage a housing side of the assembly housing.

In another aspect, the hook assembly may be provided at the housing top of the assembly housing.

In another aspect, the hook assembly may be selectively deployable in an extended, functional position and a folded, nonfunctional position.

In another aspect, the hook assembly may include a hook plate pivotally attached to the assembly housing to facilitate deployment of the hook plate in the extended, functional position and the folded, nonfunctional position.

In another aspect, the hook plate of the hook assembly may be disposed in perpendicular relationship to the plane of the housing top of the assembly housing in the extended, functional position and may lie parallel to and against the housing top of the assembly housing in the folded, nonfunctional position.

In another aspect, at least one lock plate retainer may retain the hook plate of the hook assembly in the folded, nonfunctional position.

In another aspect, the at least one lock plate retainer may include at least one retaining magnet.

In another aspect, at least one hook plate hinge may pivotally attach the hook plate to the housing top of the assembly housing.

In another aspect, the hook plate hinge may pivotally attach the hook plate to the housing top at or adjacent to the housing front of the assembly housing.

In another aspect, the hook plate of the hook assembly may have a proximal hook plate edge at the hook plate hinge and a distal hook plate edge opposite the proximal hook plate edge.

In another aspect, a marker may extend along at least a portion of the distal hook plate edge of the hook plate.

In another aspect, at least a portion of the distal hook plate edge may be magnetized to assist a user in picking up metallic objects.

In another aspect, the marker may be graphite.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG.

1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward a tape measure light attachment which can be deployed on the extended measuring tape of a tape measure for illumination purposes.

Figure 7:
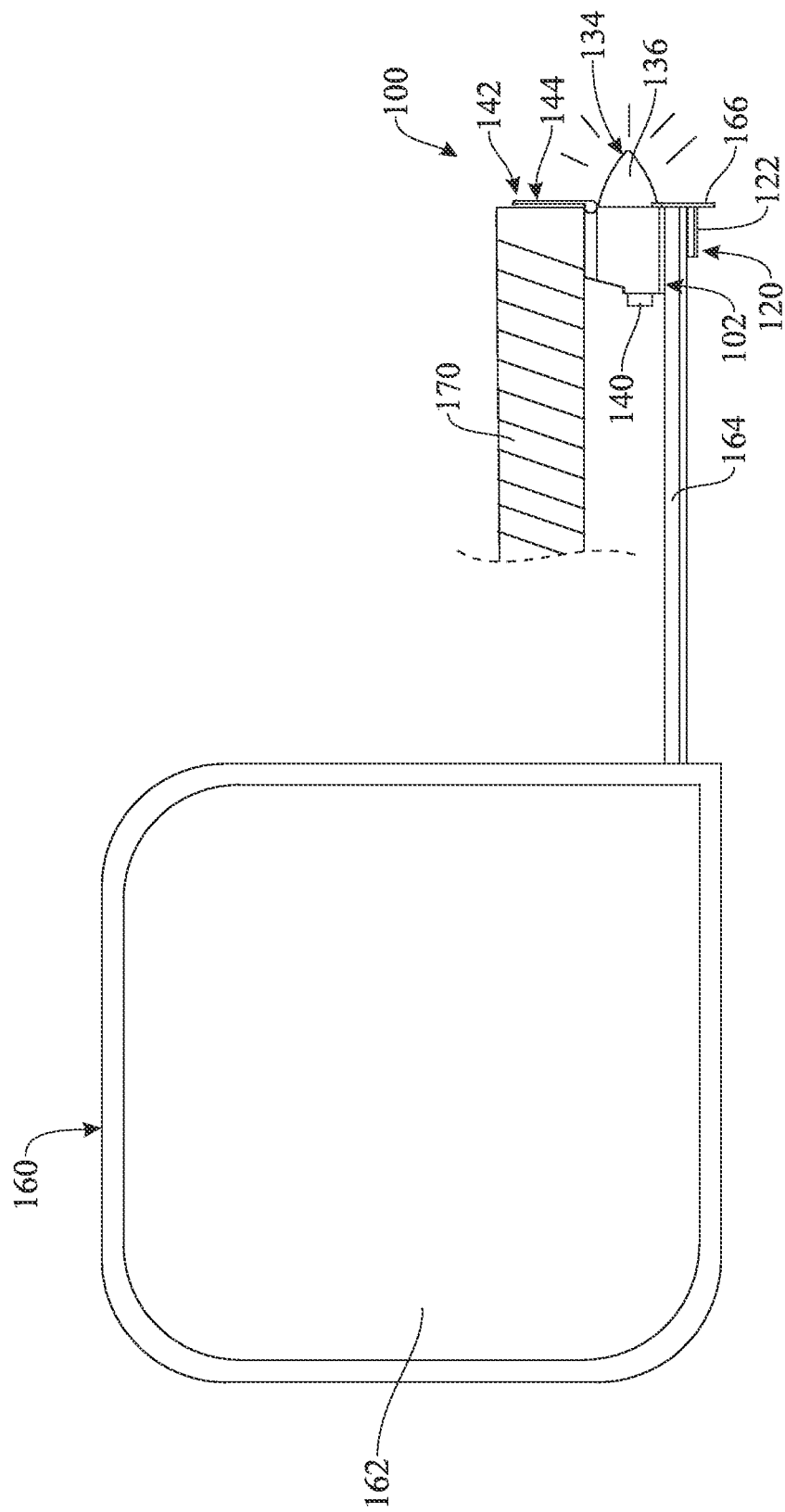
FIG. 7 presents a side view of the illustrative tape measuring light attachment, deployed on the extended measuring tape of the tape measure and with the light assembly energized and with the hook assembly deployed in the extended, functional position and engaging a retaining structure as the measuring tape is extended form the tape housing of the tape measure.

Referring initially to FIGS. 1-7, a tape measure light attachment, hereinafter attachment 100, is illustrated in accordance with an exemplary embodiment of the present invention. As shown for instance in FIG. 1, the attachment 100 may include an assembly housing 102. A light assembly 134 may be provided on the assembly housing 102. The light assembly 134 may be selectively configurable to emit light upon activation. A mount assembly 120 may be provided on the assembly housing 102. The mount assembly 120 may facilitate attachment of the assembly housing 102 to a measuring tape 164 which is extended from a tape housing 162 of a tape measure 160. A hook assembly 142 may be provided on the assembly housing 102. As illustrated in FIG. 7, in typical application of the attachment 100, which will be hereinafter described, the hook assembly 142 may be configured to facilitate engagement of the assembly housing 102 with a retaining structure 170 to retain or immobilize the assembly housing 102 on the measuring tape 164 as the measuring tape 164 is extended from the tape housing 162 of the tape measure 160 to measure a length or distance from the point of engagement between the hook assembly 142 with the retaining structure 170 and the tape housing 162.

In some embodiments, the mount assembly 120 may facilitate attachment of the assembly housing 102 to the measuring tape 164 with the light assembly 134 facing forwardly from the assembly housing 102 toward the extending or distal end of the measuring tape. 164. Accordingly, the light assembly 134 may illuminate the area in front of the retaining structure 170.

In some embodiments, the assembly housing 102 of the attachment 100 may be box-shaped with a housing bottom 104. A pair of spaced-apart housing sides 106, a housing front 110 and a housing rear 112 may extend from the housing bottom 104. A housing top 108 may be supported by the housing sides 106, the housing front 110 and the housing rear 112. The assembly housing 102 may include metal, plastic and/or other suitable materials known by those skilled in the art.

The light assembly 134 may be provided at the housing front 110 of the assembly housing 102. In some embodiments, the light assembly 134 may include at least one LED. In some embodiments, the light assembly 134 may include at least one laser and/or laser pointer.

At least one light switch 140 may functionally interface with the light assembly 134. The light switch 140 may be operable to facilitate energizing and illumination of the light assembly 134. In some embodiments, the light switch 140 may include a button.

The light switch 140 may be provided at any accessible position or location on the assembly housing 102. For example and without limitation, in some embodiments, the light switch 140 may be provided at the housing rear 112 of the assembly housing 102.

Figure 1:
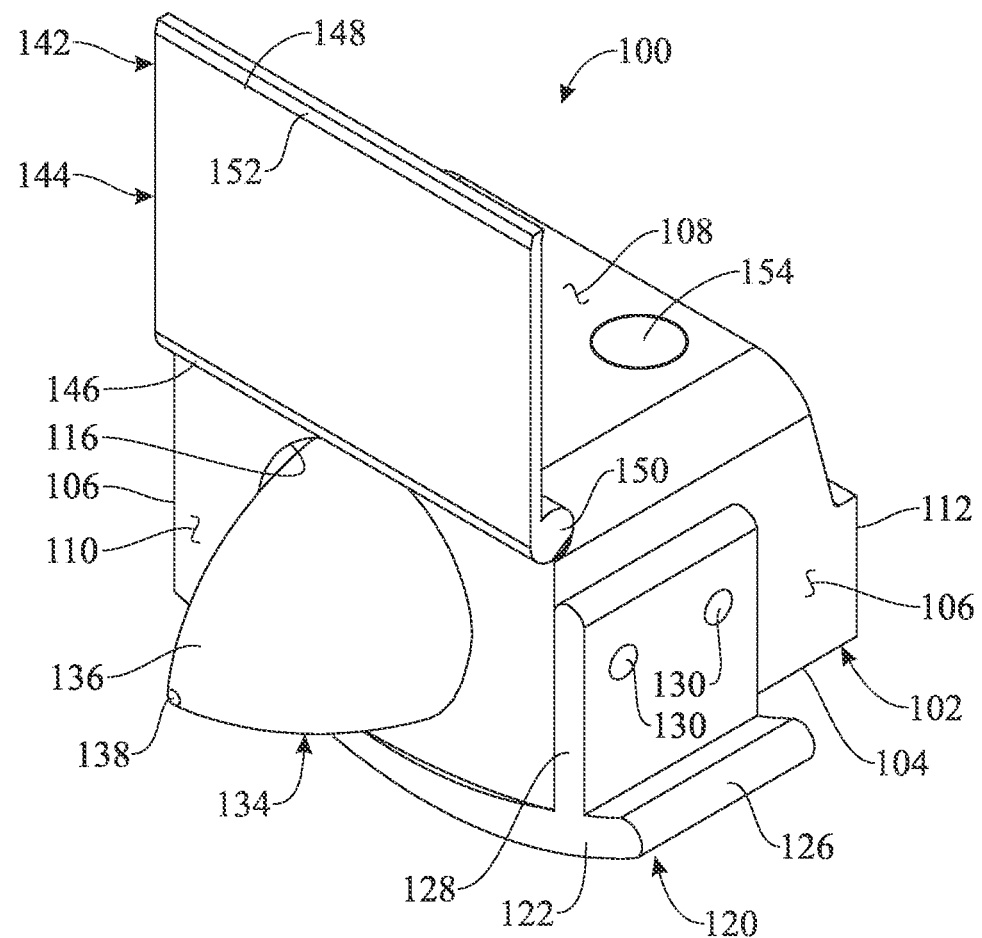
FIG. 1 presents a top front perspective view of an illustrative tape measure light attachment in accordance with an illustrative embodiment of the present invention, with the clamp arm of the mount assembly deployed in the clamping configuration.
Figure 2:
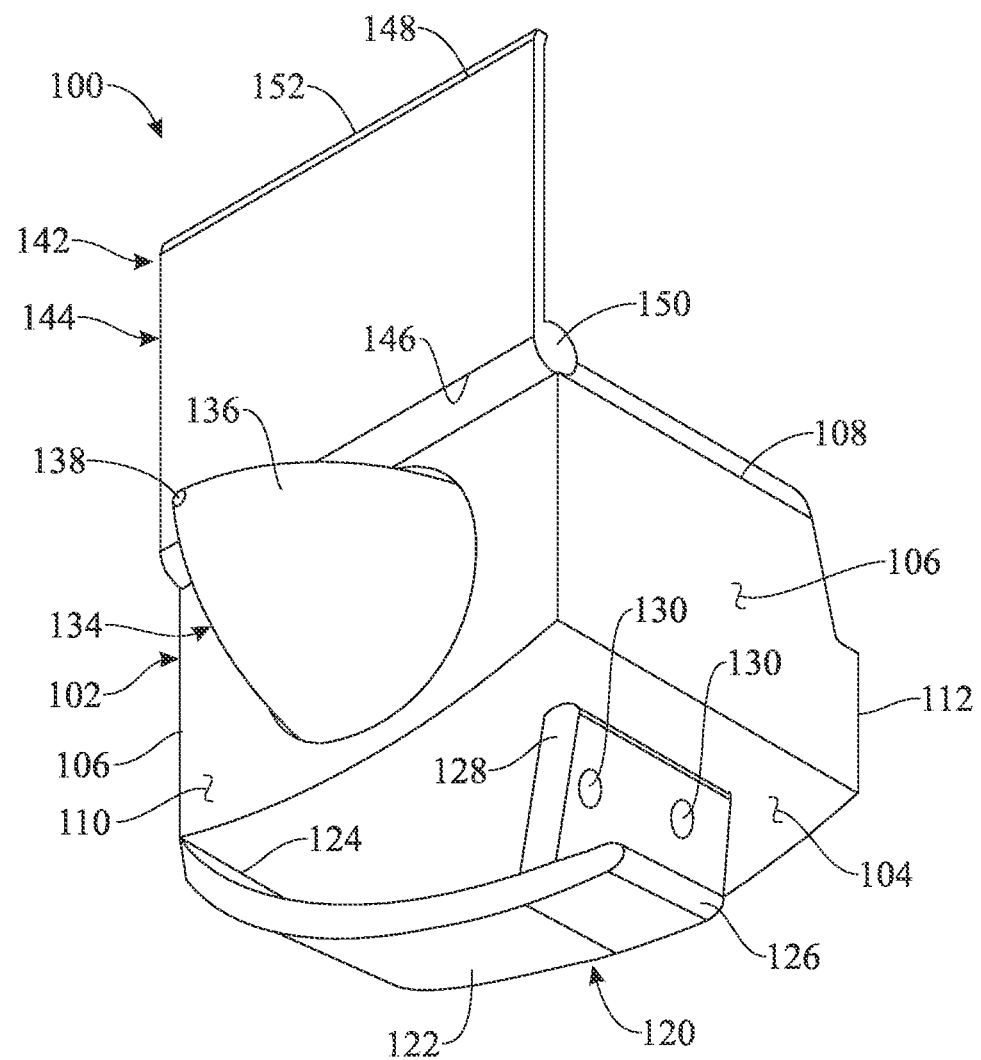
FIG. 2 presents a bottom front perspective view of the illustrative tape measure light attachment, with the clamp arm of the mount assembly deployed in the release configuration.
Figure 3:
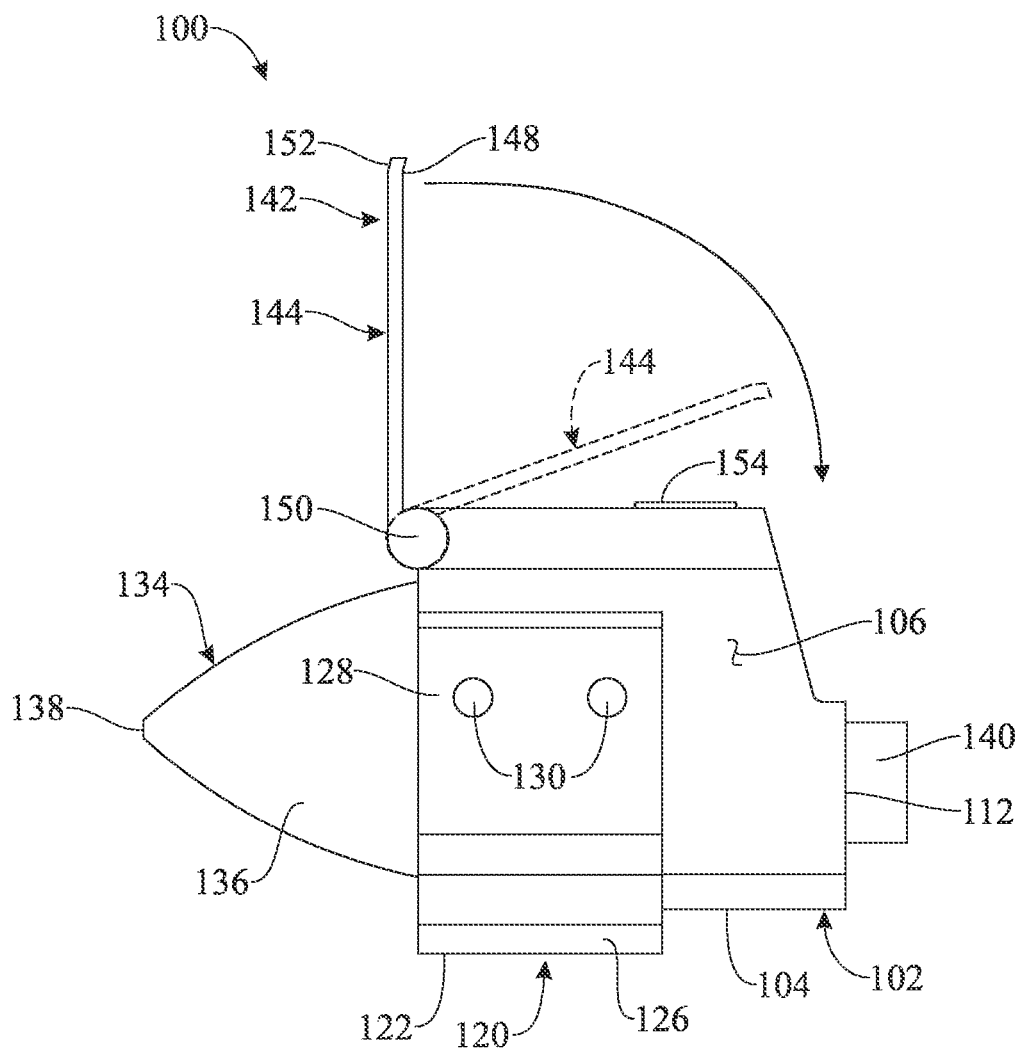
FIG. 3 presents a side view of the illustrative tape measure light attachment, with the hook plate of the hook assembly shown in the extended, functional position (in solid lines) and approaching the folded, nonfunctional position (in dashed lines)
Figure 4:
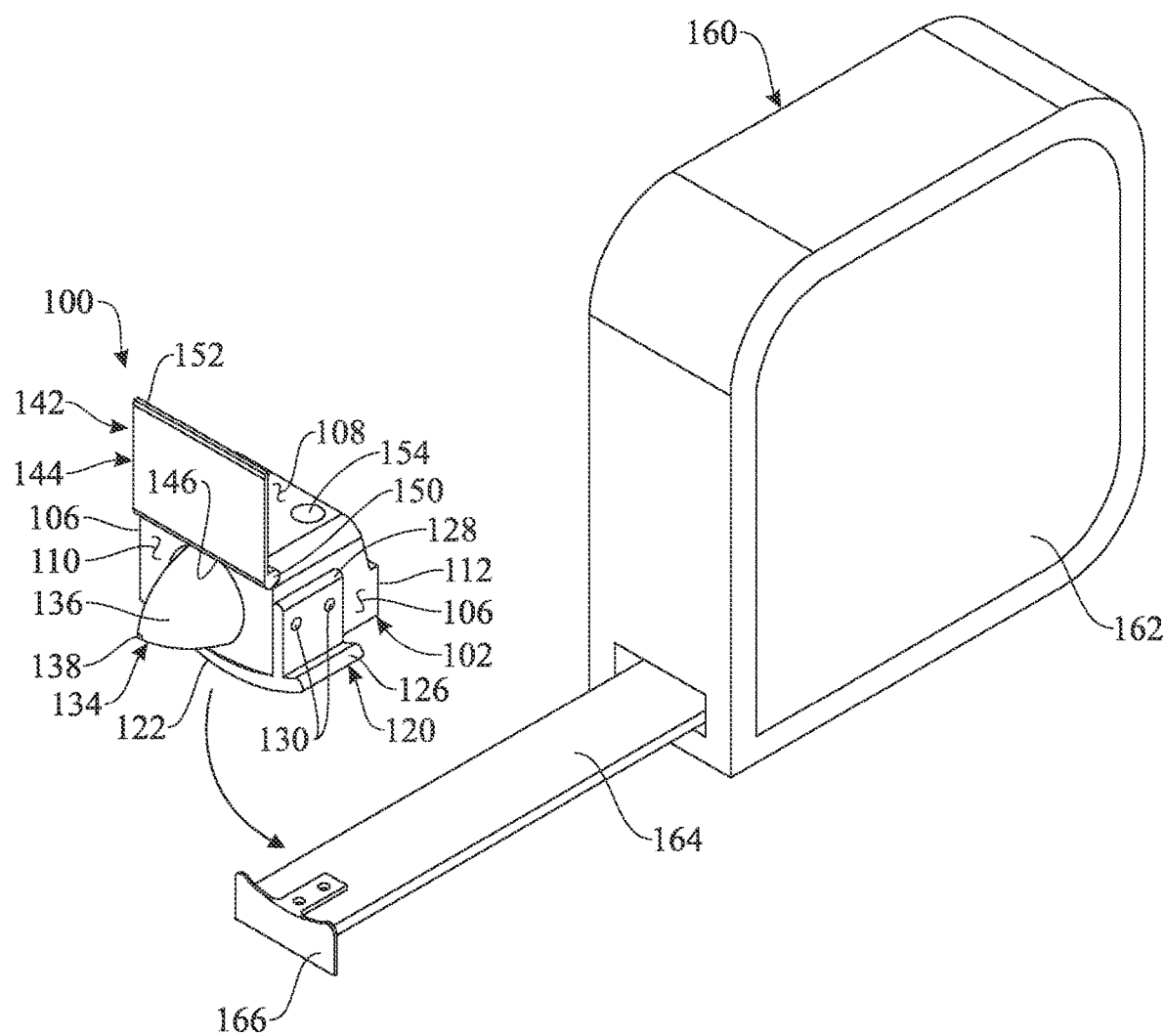
FIG. 4 presents a top front perspective view of the illustrative tape measuring light attachment, more particularly illustrating typical deployment of the tape measure light attachment on the extended measuring tape of a tape measure in typical application of the tape measuring attachment.
Figure 5:
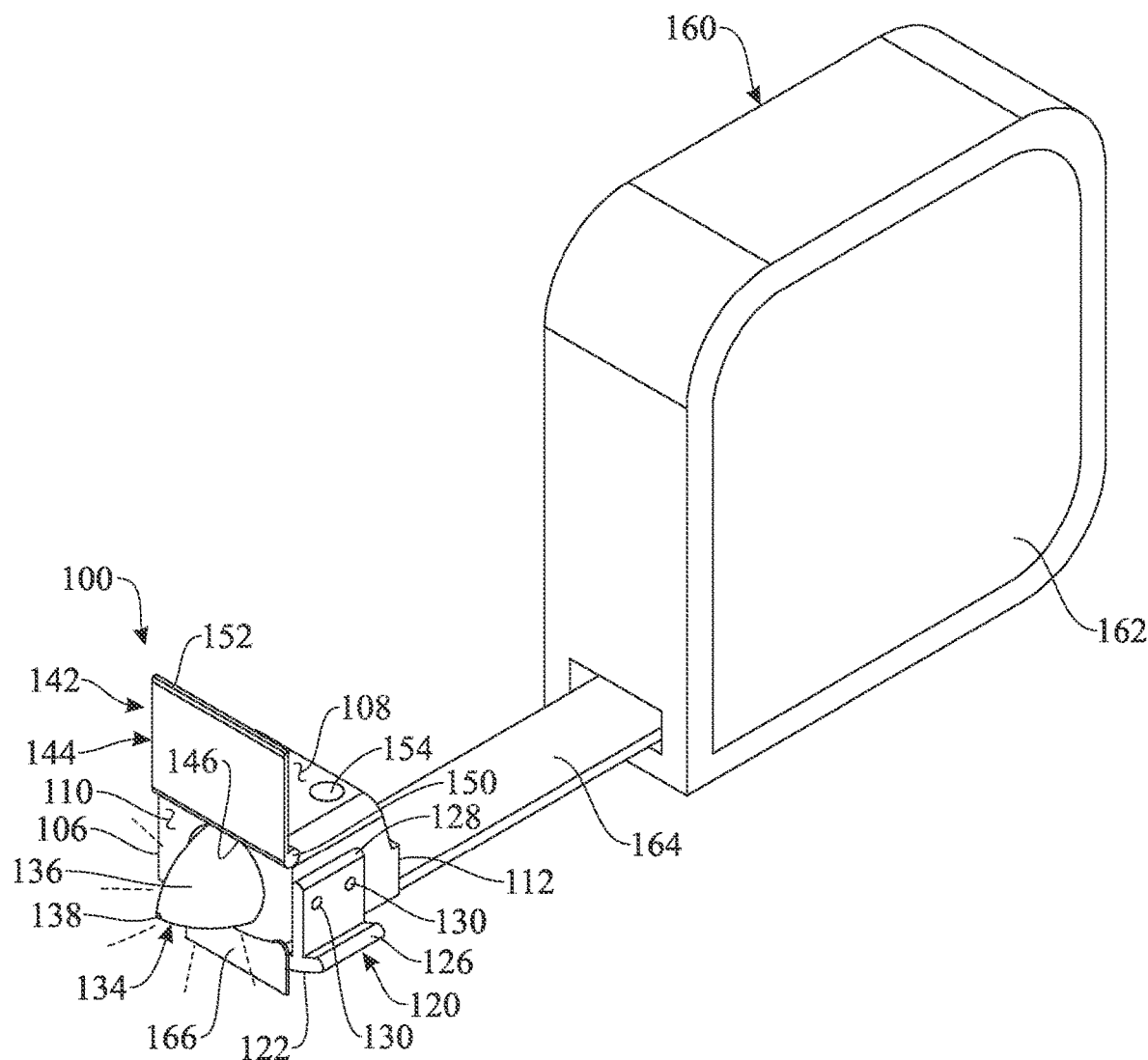
FIG. 5 presents a top front perspective view of the illustrative tape measuring light attachment, deployed on the extended measuring tape of the tape measure and with the light assembly energized.
Figure 6:
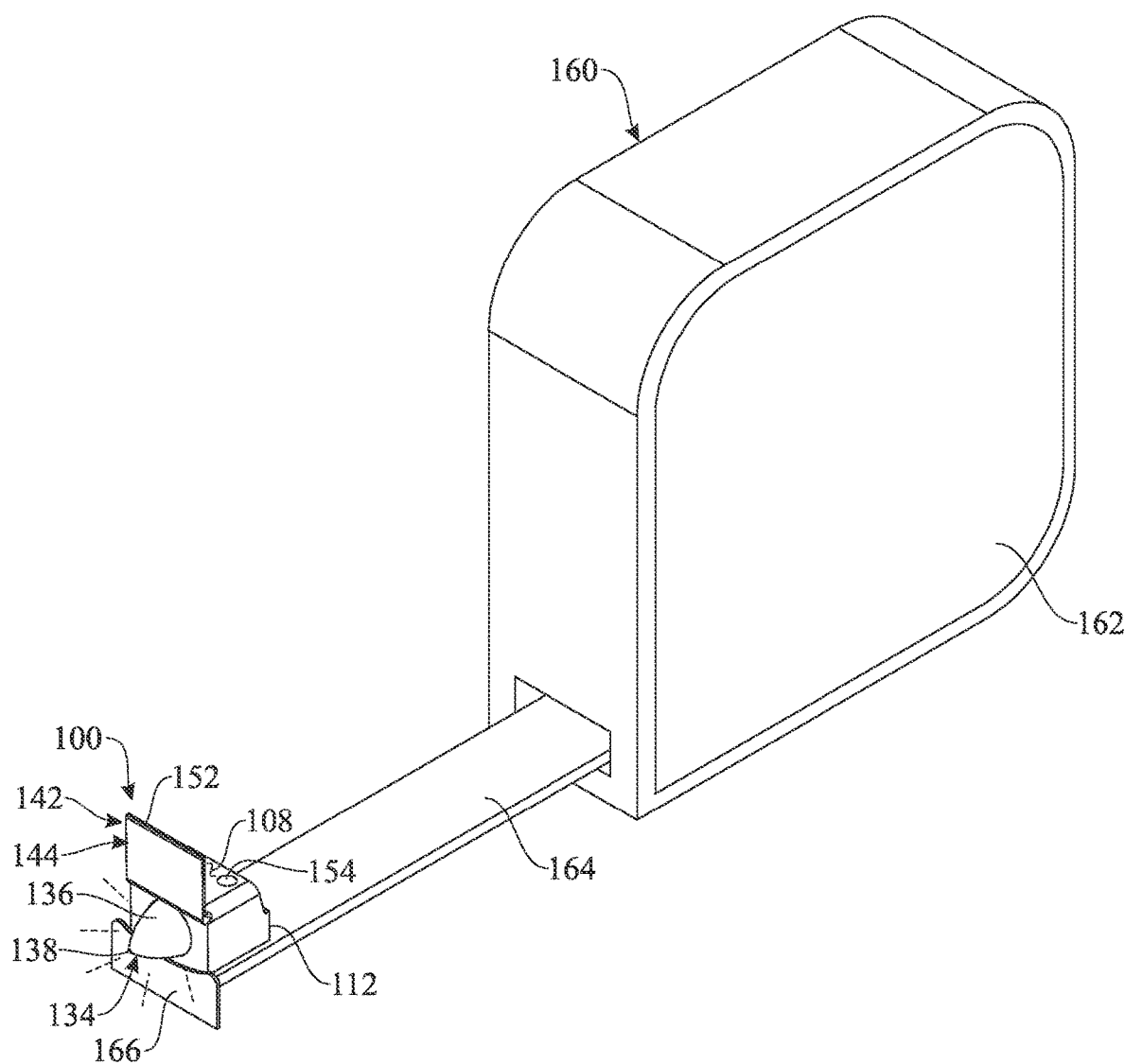
FIG. 6 presents a top front perspective view of the illustrative tape measuring light attachment, deployed on the extended measuring tape of the tape measure and with the light assembly energized, with the measuring tape extended farther from the tape housing than that illustrated in FIG. 5.

As illustrated in FIGS. 1-3, in some embodiments, the light assembly 134 may include a light cover 136. As illustrated in FIGS. 1 and 2, the light cover 136 of the light assembly 134 may extend through a light cover opening 116 in the housing front 110 of the assembly housing 102. A beam opening 138 may extend through the light cover 136. The beam opening 138 may facilitate emission of a beam of light which is generated by the light assembly 134 from the light cover 136 through the beam opening 138.

In some embodiments, the light cover 136 may have an elongated, conical shape with a tapered cover end. The beam opening 138 may be provided at the cover end of the light cover 136. In some embodiments, the tapered cover end of the light cover 136 may be magnetized to enable a user of the attachment 100 to pick up metallic objects using the magnetized cover end.

In another aspect, a range finding device (not illustrated) may be provided in the assembly housing 102. The range finding device may be configured to emit a light or laser beam from the assembly housing 102 against a structure or surface and calculate the distance of the structure or surface from the assembly housing 102 by reflection of the light or laser beam.

The mount assembly 120 may be configured to secure the extended measuring tape 164 of the tape measure 160 against the housing bottom 104 of the assembly housing 102. Accordingly, in some embodiments, the mount assembly 120 may include a clamp arm 122 pivotally attached to the assembly housing 102. The clamp arm 122 may be selectively configurable in a clamping configuration (FIG. 1) to secure the assembly housing 102 on the extended measuring tape 164 of the tape measure 160 and a release configuration (FIG. 2) to facilitate removal of the assembly housing 102 from the measuring tape 164.

In some embodiments, the clamp arm 122 of the mount assembly 120 may be elongated with a proximal arm end 124 pivotally attached to the assembly housing 102 and a distal arm end 126 opposite the proximal arm end 124. The proximal arm end 124 of the clamp arm 122 may be pivotally attached to the assembly housing 102 at a junction between the housing bottom 104 and one of the housing sides 106.

The mount assembly 120 may include a lock tab 128 on the clamp arm 122. The lock tab 128 may be configured to detachably secure the clamp arm 122 in the clamping configuration illustrated in FIG. 1. In some embodiments, the lock tab 128 may be provided at or adjacent to the distal arm end 126 of the clamp arm 122.

At least one tab retainer 130 may be provided on the lock tab 128 to facilitate securement of the lock tab 128 to the assembly housing 102. In some embodiments, the tab retainer 130 may include at least one tab magnet. The tab magnet may be configured for magnetic attachment to the assembly housing 102 in the clamping configuration of the clamp arm 122. As illustrated in FIG. 1, in some embodiments, the tab magnet 130 on the lock tab 128 may be configured to engage a housing side 106 of the assembly housing 102.

The hook assembly 142 may be provided at the housing top 108 of the assembly housing 102. In some embodiments, the hook assembly 142 may be selectively deployable in an extended, functional position (illustrated in solid lines in FIG. 3) and a folded, nonfunctional position (FIG. 7). The hook assembly 142 may include a hook plate 144 pivotally attached to the assembly housing 102 to facilitate deployment of the hook plate 144 in the extended, functional position and the folded, nonfunctional position. In some embodiments, the hook plate 144 of the hook assembly 142 may be disposed in perpendicular relationship to the plane of the housing top 108 of the assembly housing 102 in the extended, functional position and may lie parallel to and against the housing top 108 of the assembly housing 102 in the folded, nonfunctional position.

At least one lock plate retainer 154 may be configured to retain the hook plate 144 of the hook assembly 142 in the folded, nonfunctional position. For example and without limitation, in some embodiments, the lock plate retainer 154 may include at least one retaining magnet on the housing top 108 of the assembly housing 102. The retaining magnet may magnetically engage and retain the hook plate 144 in the folded, nonfunctional position of the hook assembly 142.

At least one hook plate hinge 150 may pivotally attach the hook plate 144 to the housing top 108 of the assembly housing 102. In some embodiments, the hook plate hinge 150 may pivotally attach the hook plate 144 to the housing top 108 at or adjacent to the housing front 110 of the assembly housing 102. The hook plate 144 of the hook assembly 142 may have a proximal hook plate edge 146 at the hook plate hinge 150 and a distal hook plate edge 148 opposite the proximal hook plate edge 146.

In some embodiments, a marker 152 may extend along at least a portion of the distal hook plate edge 148 of the hook plate 144. The marker 152 may enable a user of the light attachment 100 to make distance markings (not illustrated) on a floor or other structure in use of the tape measure 160. In some embodiments, the marker 152 may be graphite. In some embodiments, at least a portion of the distal hook plate edge 148 of the hook plate 144 may be magnetized to assist a user in picking up metallic objects.

In typical application, the attachment 100 may be deployed on the measuring tape 164 a length or segment of which is initially extended from the tape housing 162 of the tape measure 160. A tape retaining flange 166 may terminate the extending or distal end of the measuring tape 164. Accordingly, the assembly housing 102 of the attachment 100 may be secured to the measuring tape 164 by initially pivoting the clamp arm 122 of the mount assembly 120 to the release configuration (FIG. 2). In an alternative form, the attachment may be integrated to the distal end of the measuring tape of the tape measure such that the entire assembly is permanently affixed to the distal end of the tape measure of the measuring tape. The housing bottom 104 of the assembly housing 102 may be placed on the extended measuring tape 164 with the housing front 110 of the assembly housing 102 typically engaging the tape retaining flange 166 on the measuring tape 164. The clamp arm 122 may next be pivoted back to the clamping configuration (FIG. 1) such that the measuring tape 164 is clamped between the clamp arm 122 and the assembly housing 102. The lock tab 128 may be attached to the housing side 106 of the assembly housing 102 typically via the tab retainer 130.

The hook plate 144 of the hook assembly 142 may be pivoted from the folded, nonfunctional position to the extended, functional position illustrated in solid lines in FIG. 3. As illustrated in FIG. 7, the extended hook plate 144 may be placed into engagement with a retaining structure 170, after which the tape housing 162 may be pulled away from the measuring tape 164 of the tape measure 160. The light assembly 134 may be energized typically by manipulation of the light switch 140 to illuminate the area in front of the assembly housing 102 at the end of the extended measuring tape 164. In some applications, the light assembly 134 may include at least one laser or laser pointer which emits a laser beam (not illustrated) from the light cover 136 through the beam opening 138. The numbered markings (not illustrated) on the measuring tape 164 may be used to measure the distance between the tape housing 162 and the tape retaining flange 166 at the extending end of the measuring tape 164. After use of the tape measure 160, the attachment 100 may be removed from the measuring tape 164 and the measuring tape 164 retracted back into the tape housing 162 of the tape measure 160.

In some applications, the marker 152 on the hook plate 144 of the hook assembly 142 may be applied against a surface typically to mark distances measured by the tape measure 160.

In some embodiments, a light and a laser (not illustrated) may be provided on opposite ends of the assembly housing 102. The assembly housing 102 may be fitted with a rivet (not illustrated) which enables the assembly housing 102 to rotate 360°. Accordingly, the attachment 100 may be rotated to use the laser as a string line or the light to illuminate confined spaces such as pipes, manholes and workspaces. In some embodiments, a bubble or level (not illustrated) may be provided on the assembly housing 102 for leveling purposes. In another exemplary embodiment, the attachment 100 may be integrated to an existing measuring tape of a tape measure.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A tape measure light attachment deployable on a measuring tape of a tape measure, comprising:
    an assembly housing comprising opposite front and back walls;
    a light assembly attached to the assembly housing such that the light assembly extends outwardly from the front wall, the light assembly being configured to emit light upon activation;
    a mounting assembly attached to the assembly housing and configured to facilitate removable attachment of the assembly housing to a distal end of the measuring tape of the tape measure; and
    a hook assembly attached to the assembly housing configured to facilitate engagement of the assembly housing with a structure.

2. The tape measure attachment of claim 1, wherein the tape measure comprises a tape housing, the measuring tape extending from the tape housing, the light assembly being provided to face away from the tape housing of the tape measure.

3. The tape measure attachment of claim 1, wherein the light assembly includes at least one LED.

4. The tape measure attachment of claim 1, wherein the tape measure light attachment includes a range-finding device capable of emitting a laser beam to determine a distance between the assembly housing and a structure.

5. The tape measure attachment of claim 1, wherein the light assembly includes a functional switch for emitting light when the switch is toggled from an OFF position to an ON position.

6. The tape measure attachment of claim 5, wherein the functional switch includes a depressable button that is disposed at a rear face portion of the assembly housing.

7. The tape measure attachment of claim 1, wherein the light assembly includes a light cover that covers a light source that emits a light beam through a distal opening on the light cover upon activation of the light source.

8. The tape measure attachment of claim 7, wherein the light cover is magnetized.

9. The tape measure attachment of claim 1, wherein the mounting assembly includes a clamp arm pivotally attached to the assembly housing.

10. The tape measure attachment of claim 9, wherein the clamp arm is selectively configurable between a clamping configuration to secure the assembly housing to the distal end of the measuring tape and a release configuration to facilitate removal of the assembly housing from the measuring tape.

11. The tape measure attachment of claim 10, wherein the clamp arm includes a lock tab to detachably secure the clamp arm in the clamping configuration.

12. The tape measure attachment of claim 11, wherein the lock tab includes a magnet for detachably securing the clamp arm to the housing assembly.

13. The tape measure attachment of claim 1, wherein the hook assembly is selectively deployable between an extended position for securing the hook assembly to the structure and a folded position.

14. The tape measure attachment of claim 1, wherein the hook assembly includes a hook plate pivotally attached to the assembly housing.

15. The tape measure attachment of claim 14, wherein the hook plate is disposed of in a perpendicular relationship to a top end surface of the assembly housing when the hook plate is in an extended position, and the hook plate is disposed of in a parallel relationship to the top end surface of the assembly housing when the hook plate is in a folded position.

16. The tape measure attachment of claim 14, wherein the hook plate includes a marker along a plate edge of the hook plate.

17. The tape measure attachment of claim 14, wherein the hook plate is magnetized.

18. The tape measure attachment of claim 1, wherein the hook assembly and the mounting assembly are each positioned on opposite sides of the housing assembly.

19. A tape measure light attachment deployable on a measuring tape of a tape measure, comprising:
an assembly housing comprising opposite front and back walls;
a light assembly attached to the assembly housing such that the light assembly extends outwardly from the front wall, the light assembly including at least one LED and a light cover that covers the LED that emits a light beam through a distal opening on the light cover upon activation of the light source;
a clamp arm pivotally attached to the assembly housing mounting and configured to facilitate removable attachment of the assembly housing to a distal end of the measuring tape of the tape measure; and
a hook assembly attached to the assembly housing configured to facilitate engagement of the assembly housing with a structure.

20. A system comprising:
a tape measure comprising a tape housing and a measuring tape, the measuring tape having a first end positioned in the tape housing and a second end that is extendable from the tape housing, the second end including a hook; and
a tape measure light attachment deployable on the measuring tape of the tape measure, the tape measure light attachment comprising:
an assembly housing comprising opposite front and back walls, the hook of the measuring tape directly engaging the front wall;
a light assembly attached to the assembly housing such that the light assembly extends outwardly from the front wall, the light assembly including at least one LED and a light cover that covers the LED that emits a light beam through a distal opening on the light cover upon activation of the light source;
a clamp arm pivotally attached to the assembly,
wherein the clamp arm is selectively configurable between a clamping configuration to secure the assembly housing to the distal end of the measuring tape and a release configuration to facilitate removal of the assembly housing from the measuring tape, and
wherein the clamp arm includes a lock tab to detachably secure the clamp arm in the clamping configuration;
a hook assembly attached to the assembly housing configured to facilitate engagement of the assembly housing with a structure; and
a range-finding device attached to the housing assembly capable of emitting a laser beam to determine a distance between the assembly housing and the structure.

* * * * *